United States Patent [19]
Goldstein et al.

[11] Patent Number: 5,825,823
[45] Date of Patent: Oct. 20, 1998

[54] PCM CHANNEL DIAGNOSIS

[75] Inventors: Yuri Goldstein; Yuri Okunev, both of Southbury, Conn.

[73] Assignee: General DataComm, Inc., Middlebury, Conn.

[21] Appl. No.: 870,684

[22] Filed: Jun. 6, 1997

[51] Int. Cl.$^6$ .................................................. H04L 25/49
[52] U.S. Cl. ........................... 375/286; 375/222; 370/523
[58] Field of Search ..................................... 375/222, 240, 375/241, 242, 243, 286, 287; 370/523, 522; 341/120, 127

[56] References Cited

U.S. PATENT DOCUMENTS

| | | | |
|---|---|---|---|
| 4,201,909 | 5/1980 | Dogliotti et al. | 375/242 |
| 4,894,823 | 1/1990 | Adelmann et al. | 370/242 |
| 4,920,534 | 4/1990 | Adelmann et al. | 370/522 |
| 5,347,576 | 9/1994 | Taylor | 370/523 |
| 5,394,437 | 2/1995 | Ayanoglu et al. | 375/222 |
| 5,406,583 | 4/1995 | Dagdeviren | 375/5 |
| 5,515,426 | 5/1996 | Aycenda et al. | 455/73 |
| 5,528,625 | 6/1996 | Ayanoglu et al. | 375/222 |
| 5,557,638 | 9/1996 | Fisher et al. | 375/286 |
| 5,579,369 | 11/1996 | Feiner et al. | 379/22 |

FOREIGN PATENT DOCUMENTS

PCT/US95/15924 12/1995 WIPO.

OTHER PUBLICATIONS

ITU–T Recommendation V.34, Sep. 1994, "Data Communication Over the Telephone Network".

"The Capacity of PCM Voiceband Channels", Kalet, et al., IEEE Intern'l Conference on Communications'93, pp. 507–511.

"A Mathematical Theory of Communication". Bell Systems Technical Journal, 27:379–423, 623–656.

*Primary Examiner*—Chi H. Pham
*Assistant Examiner*—Emmanuel Bayard
*Attorney, Agent, or Firm*—David P. Gordon; David S. Jacobson; Thomas A. Gallagher

[57] ABSTRACT

A two-level or three-level probing signal is generated by a transmitter for transmission over a channel and for detection and analysis by a receiver. The two-level probing signal is a signal having a first PCM $\mu$-law level over a first frame, and a second PCM $\mu$-law level over a second frame. The two-level probing signal when combined with detection and analysis is generally sufficient for determining the presence and order of RB-signaling and PAD attenuation, and the extent of PAD attenuation may also be determined. The three-level probing signal is similar to the two-level probing signal but includes a third $\mu$-law level over a third frame. A preferred two-level probing signal is a signal having a PCM $\mu$-law level of ±975 for a first frame, and a signal having a PCM $\mu$-law level of ±1023 for a second frame (or vice versa), although other sets of signals such as ±1087 and ±879 can be utilized. One preferred three-level probing signal is a signal having a PCM $\mu$-law level of ±975 for a first frame, and a signal having a PCM $\mu$-law level of ±1023 for a second frame, and a signal having a PCM $\mu$-law level of ±1151 for a third frame, although other sets of signals (e.g., 911, 943, and 1151; 943, 975 and 1151; 911, 975, and 1151) can be utilized. At the receiver, the received signals are compared to a set of predetermined threshold values, and based on those comparisons, decisions as to the presence and order of RB-signaling and PAD attenuation are made.

19 Claims, 3 Drawing Sheets

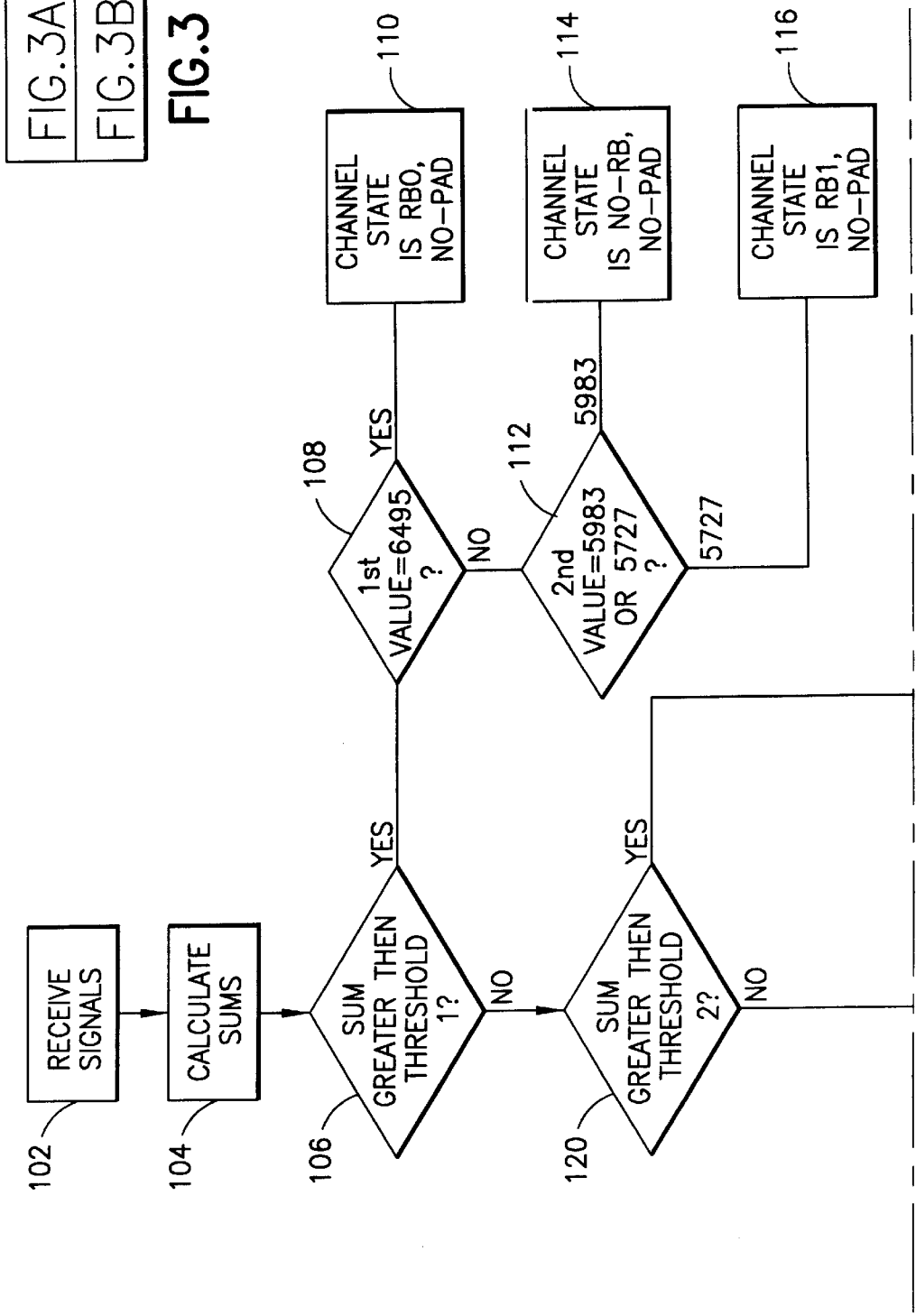

PCM CHANNEL DIAGNOSIS

This invention relates to co-owned U.S. Ser. No. 08/801,066 entitled "Mapper for High Data Rate Signalling" filed Feb. 14, 1997, co-owned U.S. Ser. No. 08/807,955 entitled "Mapper for High Data Rate Signalling" filed Mar. 4, 1997, and co-owned U.S. Ser. No. 08/838,367 entitled "Mapper for High data Rate Transmission Through Channels Subject to Robbed Bit Signalling" filed Apr. 8, 1997, all of which are hereby incorporated by reference herein in their entireties.

BACKGROUND OF THE INVENTION

1. Field of the Invention

The present invention relates broadly to telecommunications. More particularly, the invention relates to the probing of telecommunication-channels which are subject to the presence of robbed bit signaling (RB-signaling) and PAD attenuation.

2. State of the Art

With the ever-increasing importance of telecommunications for the transfer of data as well as voice, there has been a strong effort to increase data transfer rates over the telephone wires. Recently, the ITU-T adopted the V.34 Recommendation (International Telecommunication Union, Telecommunication Standardization Sector Recommendation V.34, Geneva, Switzerland 1994) which is hereby incorporated by reference herein in its entirety. The V.34 standard and subsequent amendments define modem operating speeds of 28.8 kbps up to 33.6 kbps, and the vast majority of modems being sold today adhere to the V.34 Recommendation. However, with the explosion in the use of the Internet, even at the V.34 transfer rates, downloading of large files available on the Internet can take long periods of time. Thus, recently, there has been a thrust to provide additional standards recommendations which will increase data transfer rates even further (note the TIA TR-30.1 PAM Modem ad hoc group and the ITU-T Study Group 16).

Recognizing that further increases in data rates is theoretically limited where the telecommunication network is an analog system (see C. E. Shannon, "A Mathematical Theory of Communication," *Bell System Technical Journal*, 27:379–423, 623–656 (1948)), there have been various proposals to take advantage of the fact that much of the telecommunication network is now digital. For example, U.S. Pat. No. 5,394,437 to Ayanoglu et al., U.S. Pat. No. 5,406,583 to Dagdeviren, and U.S. Pat. No. 5,528,625 to Ayanoglu et al. (all assigned to AT&T/Lucent and all of which are hereby incorporated by reference herein in their entireties) all discuss techniques which utilize the recognition that the network is mostly digital in order to increase data transmission rates to 56 kbps and higher. Similarly, Kalet et al., "The Capacity of PAM Voiceband Channels," *IEEE International Conference on Communications '93*, pages 507–511 Geneva, Switzerland (1993) discusses such a system where the transmitting end selects precise analog levels and timing such that the analog to digital conversion which occurs in the central office may be achieved with no quantization error. PCT application number PCT/US95/15924 (Publication WO 96/18261) to Townshend which is hereby incorporated by reference herein in its entirety) discusses similar techniques. All of the disclosures assume the use of PAM (pulse amplitude modulation) digital encoding technology rather than the QAM (quadrature amplitude modulation) currently used in the V.34 Recommendation. The primary difference between the AT&T technology and the Townshend reference is that the AT&T technology suggests exploiting the digital aspect of the telephone network in both "upstream" and "downstream" directions, while Townshend appears to be concerned with the downstream direction only. Thus, systems such as the "x2" technology of US Robotics which are ostensibly based on Townshend envision the use of the V.34 Recommendation technology for upstream communications.

As will be appreciated by those skilled in the art, the technologies underlying the V.34 Recommendation, and the proposed 56 kbps modem are complex and typically require the use of high-end digital signal processors (DSPs). One of the complex tasks of the modem is the mapping of digital data into a sequence of digital signals chosen from a constellation which are converted into an analog signal by a D/A converter. In the V.34 Recommendation, the preferred constellation is a four-dimensional constellation, whereas in the envisioned 56 kbps modems, the constellation is envisioned as a one-dimensional PAM constellation which complies with $\mu$-law (A-law in Europe) requirements. According to $\mu$-law requirements which are set forth in ITU-T Recommendation G.711 which is hereby incorporated by reference herein in its entirety, the total constellation consists of 255 signal levels; 127 positive, 127 negative, and zero. Both the positive portion of the constellation and the negative portion of the constellation include eight sectors with sixteen points each (the constellation being shown in Appendix 1 hereto), with zero being a common point for both portions. As is well known in the art, the minimum distance between points in sector 1 of the constellation is a distance "2". In sector 2, the minimum distance is "4", while in sector 3, the minimum distance is "8". In the eighth sector, the minimum distance is "256".

Using the full PAM $\mu$-law constellation, theoretically, a bit rate of almost 64 kbps can be transmitted over the analog local loop to the digital network. However, the average power of such a constellation would be about −4 dBm, and the minimum distance between points would be a distance of "2". Such a large average power is undesirable when compared to the present restrictions of an average power of −12 dBm on the network; and such a minimum distance is also undesirable, with minimum distances of at least "4" and preferably "8" being considerably more desirable in reducing errors due to noise.

Besides noise, PCM digital signals are often subjected to two sources of distortion: robbed bit signaling (RB-signaling), and digital PAD attenuation. Robbed bit signaling is a mechanism utilized in the digital transport system (e.g., a T1 trunk) for signal control and status information between network equipment. PAD attenuation is similarly found in the digital transport system for the purpose of adjusting signal levels required for different analog and digital equipment. Where RB-signaling or PAD attenuation is present, bit rates approaching 64 kbps are not achievable, because the RB-signaling and PAD attenuation introduce errors into the transmitted signal.

With the systems of the prior art, errors resulting from robbed bit signaling may be introduced in several ways. First, if the PAM constellation includes two points having adjacent codes (e.g., 10110000 and 10110001), then by robbing and changing the lsb, a direct error is introduced. However, even if the PAM constellation does not have points with adjacent codes, the robbing and changing of a bit can introduce error because the minimum distance between points is reduced. For example, in the case of a 40 kbps data rate, where the optimal thirty-two point constellation having a minimum distance (Dmin=96) appears as follows, z1=[0,0,0,0,0,0,0,0,0,0,0,0,0,0,0,0]

z2=[0,0,0,0,1,0,0,0,0,0,0,0,0,0]
z3=[0,0,0,0,0,1,0,0,0,0,0,0,0,0]
z4=[0,1,0,0,0,0,0,1,0,0,0,0,0,1]
z5=[0,0,0,1,0,0,1,0,0,1,0,0,1,0,0,1]
z6=[0,1,0,1,0,1,0,1,0,1,0,1,0,0,0,0]
z7=[0,0,0,0,0,0,0,0,0,0,0,0,0,0]
z8=[0,0,0,0,0,0,0,0,0,0,0,0,0,0]
after robbed bit signaling, the constellation will be transformed into the following constellation,
z1=[0,0,0,0,0,0,0,0,0,0,0,0,0,0]
z2=[0,0,0,0,1,1,0,0,0,0,0,0,0,0]
z3=[0,0,0,0,0,0,1,1,0,0,0,0,0,0]
z4=[0,1,0,0,0,0,0,0,1,1,0,0,0,0,1,1]
z5=[0,0,1,1,0,0,1,1,1,1,0,0,1,1,1,1]
z7=[0,0,0,0,0,0,0,0,0,0,0,0,0,0]
z8=[0,0,0,0,0,0,0,0,0,0,0,0,0,0]
which has a minimum distance Dmin=32. In addition, the power of the constellation may be increased due to robbed bit signaling. As a result, while the original constellation might meet certain power requirements, the resulting signal could be in violation of the power requirements. Therefore, different signal constellations such as are described in detail in related application Ser. No. 08/838,367 are required in order to provide high data rates while accounting for RB-signaling.

The errors resulting from unknown PAD attenuation can be even more pronounced than the errors introduced by RB-signaling. In PAD attenuation, the $\mu$-law set of signaling points are transformed into different sets of points, depending upon the extent of the attenuation (e.g., 3 dB or 6 dB PAD). Examples of 3 dB PAD and 6 dB PAD transforms in comparison with the usual $\mu$-law set are seen in Appendix 1 hereto. As can be seen, these transforms lead to changes in both point distribution and distances between points. Therefore, as a rule, PCM transmission requires a special signal constellation for a PAD-attenuated channel, as well as for a RB-signaling channel. Moreover, different PAD attenuations require different signal constellations. Examples of signal constellations for $\mu$-law transmission with 3 dB and 6 dB digital attenuations are seen in Appendix 2 hereto.

Because different constellations are required in order to optimize data transmission rates in the presence of RB-signaling and PAD attenuation, it is highly desirable to diagnose the state of a channel prior to a data transmission session. It is known in the (non-PCM) modem arts to probe a channel with a series of signals to ascertain various parameters of the channel or receiving modem. While probing of a channel for PCM data transmission might obviously be accomplished by sending sequentially all two hundred fifty-five $\mu$-law signal levels in each slot within a frame, such a probing sequence would be undesirably long.

SUMMARY OF THE INVENTION

It is therefore an object of the invention to provide apparatus for and methods of probing a telecommunications channel over which PCM data is to be transferred.

It is another object of the invention to provide an efficient method of probing a telecommunications channel for PAD attenuation and RB-signaling prior to establishing a data transmission session.

It is a further object of the invention to provide apparatus for and methods of probing a PCM telecommunications channel which permit determination of the amount of decibel PAD attenuation present in the channel.

It is an additional object of the invention to provide apparatus for and methods of probing a telecommunications channel for PAD attenuation and RB-signaling where the signal probing sequence has a desirably low DC component and an acceptable average power.

In accord with the objects of the invention, a two-level or three-level probing signal is generated by a transmitter for transmission over a channel and for detection and analysis by a receiver. The two-level probing signal is a signal having a first PCM $\mu$-law level over a first frame of preferably six symbols, and a second PCM $\mu$-law level over a second frame of preferably six symbols. The preferred two-level probing signal is a signal having a PCM $\mu$-law level of ±975 for a first frame, and a signal having a PCM $\mu$-law level of ±1023 for a second frame (or vice versa), although other sets of signals such as ±1087 and ±879 can be utilized. The preferred two-level probing signal when combined with detection and analysis is generally sufficient for determining the presence and order of RB-signaling and either 3 dB-PAD or 6 dB-PAD attenuation. The three-level probing signal similarly is a signal having a first $\mu$-law level over a first frame, a second $\mu$-law level over a second frame, and a third $\mu$-law level over a third frame. One preferred three-level probing signal is a signal having a PCM $\mu$-law level of ±975 for a first frame, and a signal having a PCM $\mu$-law level of ±1023 for a second frame, and a signal having a PCM $\mu$-law level of ±1151 for a third frame, although other sets of signals (e.g., 911, 943, and 1151; 943, 975 and 1151; 911, 975, and 1151) which may be preferred in certain circumstances can be utilized. The three-level probing signals, when combined with detection and analysis at the receiver, are generally sufficient for determining the presence and order of RB-signaling and PAD attenuation of any of 1 dB, 2 dB . . . 6 dB.

According to the invention, at the receiver, the received signals are compared to a set of predetermined threshold values, and based on those comparisons, decisions as to the presence and order of RB-signaling and PAD attenuation are made.

Additional objects and advantages of the invention will become apparent to those skilled in the art upon reference to the detailed description taken in conjunction with the provided figures.

Appendix 1 is a chart showing the non-negative $\mu$-law points with their 3 dB PAD and 6 dB PAD transforms.

Appendix 2 is a chart showing examples of multidimensional constellations useful in transmission of data in the presence of 3 dB and 6 dB digital PAD attenuation.

Table 1 is a chart setting forth RB-signaling and PAD attenuation combinations and the resulting $\mu$-law value transforms and minimum distances for two different two-level probing signals.

Table 2 is a chart setting forth another set of RB-signaling and PAD attenuation combinations and resulting $\mu$-law value transforms for a preferred two-level probing signal.

Table 3 is a chart setting forth another set of RB-signaling and PAD attenuation combinations and resulting $\mu$-law value transforms for two different two-level probing signals and a three-level probing signal.

Table 4 is a chart setting forth the set of RB-signaling and PAD attenuation combinations and resulting transforms and suggested thresholds for another three-level probing signal.

Table 5 is a chart setting forth certain sets of RB-signaling and PAD attenuation combinations and resulting $\mu$-law and A-law value transforms for a two-level probing signal and a one-level subset of that two-level probing signal.

DETAILED DESCRIPTION OF THE PREFERRED EMBODIMENTS

Figure 1:
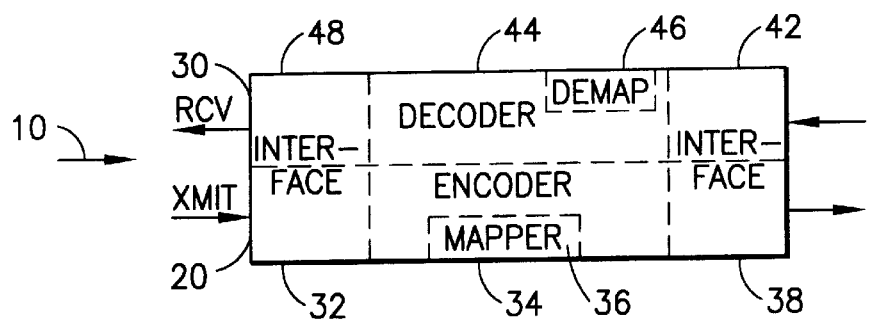
FIG. 1 is a high level block diagram of the PAM modem of the invention.

Turning to FIG. 1, a high level block diagram of a PAM modem 10 is seen. The modem 10 broadly includes a transmitter 20 and a receiver 30, each of which may be implemented in hardware, software, or a combination thereof. The transmitter includes an interface 32 to a source of digital data (such as a computer), an encoder 34 (typically implemented in a DSP and/or a microprocessor) which includes a mapper 36 and may optionally include a Trellis or convolutional encoder (not shown), and an interface 38. Additional details of the transmitter may be had with reference to the previously incorporated patent applications. For purposes herein, it should suffice to understand that the transmitter 20 has the capability of generating $\mu$-law level signals (or octets representing those signals). The $\mu$-law level signals may be generated by the transmitter 20 based on data being received by the interface 32, or based on microprocessor or logic controls as is the case of a handshake or probing sequence.

The receiver 30 (typically implemented in a DSP and/or a microprocessor) includes an interface 42 to the channel, a decoder 44, and an interface 48 to receiving equipment. Additional details regarding the receiver are well known in the art. For purposes herein, it should suffice to understand that the receiver 30 includes means for determining which $\mu$-law level signal is being received (based on the amplitude of the incoming signal), and means for comparing that $\mu$-law level (or octet representing that level) to a series of threshold values, as described hereinafter.

For purposes of the present invention, it is assumed that the PAM modem 10 of FIG. 1 should be usable in situations where RB-signaling and/or PAD attenuation may occur. In other words, it is desirable to provide a modem which can provide data which may be transmitted over T1 trunks. Thus, according to a first embodiment of the invention, a two-level probing signal used for determining the presence (or lack thereof) of RB-signaling and/or PAD attenuation is generated by the transmitter 20 for transmission over a channel and for detection and analysis by a receiver of another modem. Generally, there are five possibilities with respect to RB-signaling and PAD attenuation: no RB-signaling and no PAD attenuation, RB-signaling without PAD attenuation, PAD attenuation without RB-signaling, RB-signaling first with PAD attenuation next, and PAD attenuation first with RB-signaling next. Within all but the first possibility, there are sub-possibilities. Thus, wherever there is RB-signaling, the bit being robbed may turned into a zero (RB-0) or a one (RB-1). With respect to PAD attenuation, there are different levels of attenuation possible (typically integer levels between 1 dB and 6 dB inclusive). For example, the most prevalent attenuation possibilities in North America are a 3 dB attenuation (PAD-3) and a 6 dB attenuation (PAD-6).

Figure 2A:
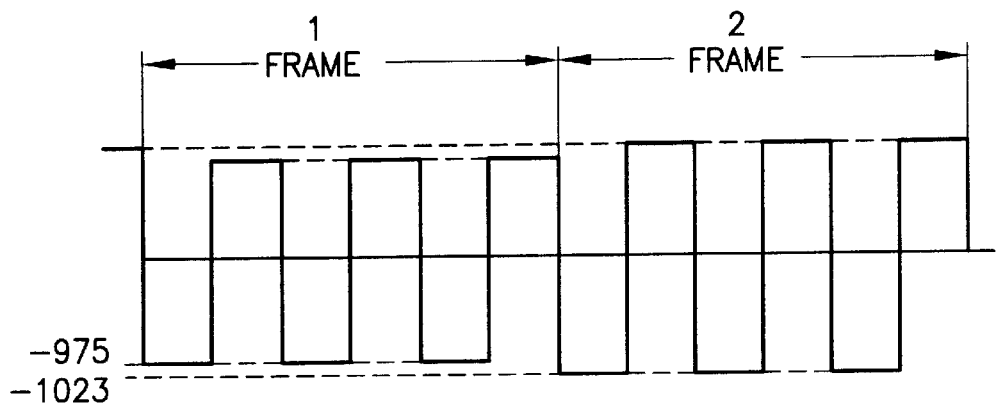
FIG. 2a is an example of a preferred two-level probing signal generated by the modem of FIG. 1.

According to the invention, and as seen in FIG. 2a, the two-level probing signal is a signal having a first PCM $\mu$-law level preferably constant over a first frame of preferably six symbols, and a second PCM $\mu$-law level preferably constant over a second frame of preferably six symbols. What is particularly required is that a predetermined first $\mu$-law level be provided in some slot of a given frame and that a second predetermined $\mu$-law level be provided in the same slot of another known frame (preferably the next frame). The preferred two-level probing signal shown in FIG. 2a is a signal having a PCM $\mu$-law level of ±975 for a first frame of six symbols, and a signal having a PCM $\mu$-law level of ±1023 for a second frame of six symbols. By sending such a signal, regardless of the distortion possibilities and sub-possibilities set forth above, a determination may be made by the receiver as to the presence of at least RB-signaling and/or PAD-1, PAD-3, PAD-4, and PAD-6 attenuation. The ability to determine which distortion possibility is actually present may be seen with reference to Table 2 where the transforms of the two levels are shown to be different for all listed combinations and subcombinations of channel states. Thus, for example, if no RB-signaling or PAD attenuation is present, the received signal levels 1023 and 975 will remain unchanged. In the presence of RB-signaling where a "1" is robbed and changed to a "0" (RB-0), and where PAD attenuation is not present, the transmitted signal level 1023 (code 10101111) will be received as 1087 (code 10101110—see Appendix 1), while the transmitted level 975 (code 10110000) will be received as sent. Conversely, in the presence of RB-signaling where a "0" is robbed and changed to a "1" (RB-1), and where PAD attenuation is not present, the transmitted signal level 1023 will be received unchanged, while the transmitted level 975 will be received as level 943 (code 10110001). Twenty-five other channel states (combinations or subcombinations) which can be distinguished are further shown in Table 2. It should be appreciated that the subcombination RB-0, PAD-1 is different than PAD-1, RB-0, as the order in which the robbed bit and the attenuation occur will provide different end results.

The two-level probing signal of signal levels 1023 and 975 has several desirable characteristics. First, the average signal power of the two-level probing signal is −12.06 dBm. Second, as seen in Table 2 (and Table 3), the probing signal does not have identical transforms for at least any RB, PAD-1, PAD-3, PAD-4, and PAD-6 (and possibly PAD-5) combinations and subcombinations. Third, as seen in Table 1, the minimum distance of the transforms of the probing signal is Dmin=16 for a single transform (RB-1, PAD-6).

While the two-level probing signal of signal levels 1023 and 975 are preferred, other sets of signals such as ±1087 and ±879 can be utilized in certain circumstances. In particular, as seen in Tables 1 and 3, the two-level probing signal 1087/879 is suitable for identifying and distinguishing robbed-bit signaling and PAD-3 and PAD-6 attenuation, although it cannot be used to distinguish between the RB-0, PAD-3, and PAD-3 and RB-0 sequences. The average signal power of the 1087/879 two-level probing signal is −12.16 dBm, with a minimum distance Dmin=16 for five transforms of the probing signal (see Table 1).

Figure 2B:
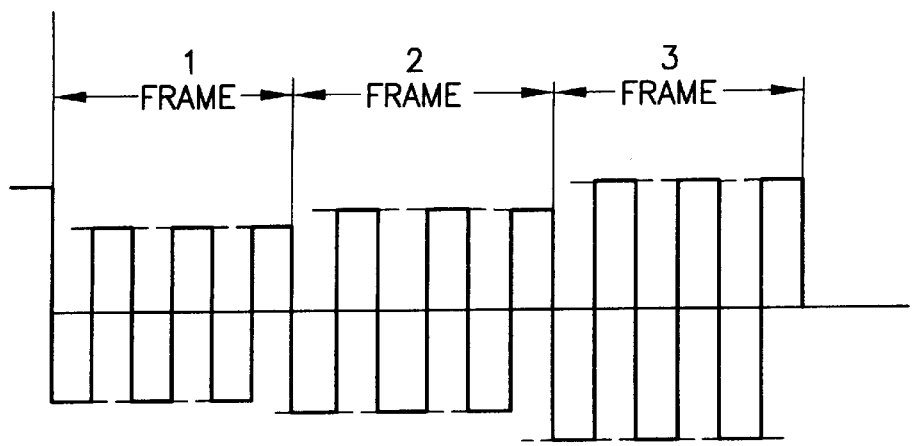
FIG. 2b is an example of a preferred three-level probing signal generated by the modem of FIG. 1.

While the described two-level probing signal are effective for distinguishing combinations and subcombinations of RB-signaling and PAD attenuation, where PAD-2 attenuation is likely to occur, a three-level probing signal can be utilized to analyze the channel. As seen in FIG. 2b, a three-level probing signal is a signal having a first $\mu$-law level over a first frame, a second $\mu$-law level over a second frame, and a third $\mu$-law level over a third frame. A first preferred three-level probing signal is a signal having a PCM $\mu$-law level of ±911 for a first frame, and a signal having a PCM $\mu$-law level of ±943 for a second frame, and a signal having a PCM μ-law level of ±1151 for a third frame. As seen in Table 3, the three-level probing signal, when combined with detection and analysis at the receiver, is generally sufficient for determining the presence and order of RB-signaling and PAD attenuation of any of PAD-1, PAD-2, PAD-3, and PAD-6. In addition, the signal power of the first preferred three-level probing signal is approximately −12 dBm.

Other preferred sets of three-level probing signals (e.g., 975, 1023, and 1151; 943, 975 and 1151; 911, 975, 1151) can be utilized to determine the presence and order of RB-signaling and PAD attenuation of one or more of PAD-1 through PAD-6. The first set (975, 1023, and 1151) has an average power of −11.61 dBm, while the second set has an average power of −11.82 dBm, and third set has an average power of −11.90 dBm. Any of these sets of three-level probing signals can be preferred where average power of the probing signal is close to −12 dBm.

In fact, where the average power of the probing signal is of no concern (e.g., if it determined that the probing signal is short enough that its average power is of no concern to the channel provider), other two-level and three-level probing signals can be readily utilized. For example, as seen in Table 4, a two-level probing signal having levels of 5983, and 6239 provide transforms which permit determination of PAD-2, PAD-3, and PAD-5 as well as RB transmission combinations and subcombinations with minimum distances of not less than 128. In addition, by adding a third probing signal of level 1599, the subcombinations of PAD-1, PAD-4, and PAD-6 can be determined, although some of the transforms of these subcombinations have minimum distances of as small as thirty-two. It should be appreciated that the power of the three-level probing signal 1599, 5983, 6239 is +2.10 dBm.

While PAD-3 and PAD-6 attenuation are most common in the U.S., Canada, Australia, Denmark and India, other attenuation levels (e.g., PAD-7) are more common in certain countries which utilize A-law (e.g., Germany, Spain, France, Italy, Russia, New Zealand). Where A-law PCM is utilized, it is without RB-signaling. Thus, where a PCM modem is to operate over different networks using A-law and μ-law, PAD identification within the range of PAD-1 through PAD-7 is desirable for A-law, while PAD identification of at least PAD-3 and PAD-6 (with and without RB-signaling) is desirable for μ-law. As seen in Table 5, the preferred two-level probing signal 1023/975 can be advantageously used for both situations. In particular, as discussed above with reference to Tables 1–3, the two-level probing signal 1023/975 can be used to find all combinations and subcombinations likely to be encountered in μ-law countries. In addition, level 1023 μ-law (10101111) corresponds to A-law level 3392 (11111010). As seen in Table 5, the A-law level 3392 can be used to distinguish between no-PAD, PAD-1, PAD-2, . . . PAD-7.

Figure 3B:
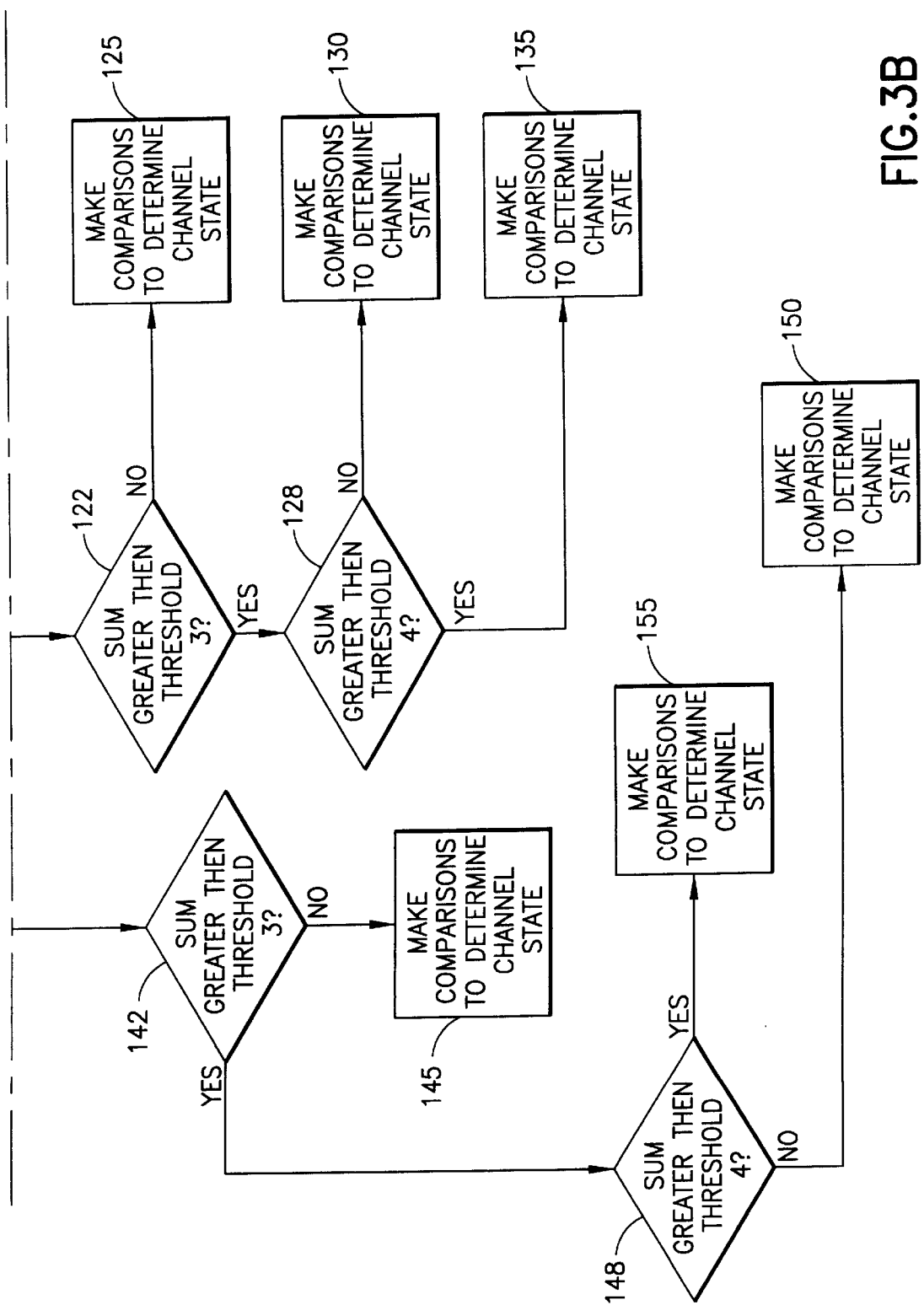
FIG. 3 is a flow chart of an exemplary receiver decision algorithm for finding the channel state based on a provided probing signal.

According to the invention, at the receiver, the received signals are compared to a set of predetermined threshold values, and based on those comparisons, decisions at to the presence and order of RB-signaling and PAD attenuation are made. For example, and with respect to the three-level probing signal of Table 4, assume that a transmitter transmits signal level 6239 at every slot of a first frame; signal 5983 at every slot of a second frame, and signal 1599 at every slot of a third frame. As seen in FIG. 3, at 102, a receiver receives signals $S_{j1}$, $S_{j2}$, and $S_{j3}$ within the j'th slot. After receiving the first two frames, at 104 the receiver calculates a sum of the received two levels for every slot; i.e., $S_j = S_{j1} + S_{j2}$ for each of the preferably six slots in the frame. The sum calculated for each slot is then subjected to the following algorithm to determine the absence or presence of RB-signaling and PAD attenuation. First, at 106, the sum $S_j$ is compared to a first threshold signal level; e.g., 11454 which is preferably half-way between the lowest sum of the no-PAD subcombinations and the highest sum of the PAD-1 subcombinations. If the sum is greater than the first threshold, then at 108, the first value $S_{j1}$ is compared to the signal level 6495. If it is equal to 6495, then at 110 a determination is made that the channel state (for that slot) is RB-0, no-PAD. If at 108 a determination is made that $S_{j1}$ is not equal to 6495, then at 112 a determination is made whether $S_{j2}$ is equal to 5983 or 5727. If $S_{j2}$ is equal to 5983, then at 114 it is determined that the channel state for that slot is no-RB, no-PAD. If $S_{j2}$ is equal to 5727, than at 116 it is determined that the channel state for that slot is RB-1, no-PAD.

Returning to 106, if it determined that the sum $S_j$ is less than the first threshold, then at 120 the sum $S_j$ is compared to a second threshold signal level 8158. If the sum is greater than the second threshold, at 122, the sum is compared to a third threshold (9150). If the sum is less than the third threshold, then at 125 a series of comparisons are made with respect to $S_{j1}$ and $S_{j2}$ to determine which of the five channel states (PAD-3 no-RB, RB-0 PAD-3, RB-1 PAD-3, PAD-3 RB-0, and PAD-3 RB-1) is present for that slot. Likewise, if the sum is greater than the third threshold, the sum is compared at 128 to a fourth threshold (10174). If the sum is less than the fourth threshold, then at 130, a series of comparisons are made with respect to $S_{j1}$ and $S_{j2}$ to determine which of the five channel states (PAD-2 no-RB, RB-0 PAD-2, RB-1 PAD-2, PAD-2 RB-0, and PAD-2 RB-1) is present for that slot. If the sum is greater than the fourth threshold, then at 135, a series of comparisons are made (utilizing $S_{j1}$, $S_{j2}$ and $S_{j3}$ from a third frame where necessary—see Table 4) to determine which of the five channel states (PAD-1 no-RB, RB-0 PAD-1, RB-1 PAD-1, PAD-1 RB-0, and PAD-1 RB-1) is present for that slot.

Returning to step 120, if the sum is less than the second threshold, at 142, the sum is compared to a different third threshold (6462). If the sum is less than the threshold 6462, then at 145 a series of comparisons are made (utilizing $S_{j1}$, $S_{j2}$, and $S_{j3}$ from a third frame where necessary—see Table 4) to determine which of the five channel states (PAD-6 no-RB, RB-0 PAD-6, RB-1 PAD-6, PAD-6 RB-0, and PAD-6 RB-1) is present for that slot. Likewise, if the sum is greater than the threshold 6462, the sum is compared at 148 to a different fourth threshold (7230). If the sum is less than the threshold 7230, then at 150, a series of comparisons (utilizing $S_{j1}$ and $S_{j2}$) are made to determine which of the five channel states (PAD-5 no-RB, RB-0 PAD-5, RB-1 PAD-5, PAD-5 RB-0, and PAD-5 RB-1) is present for that slot. If the sum is greater than the threshold 7230, then at 155, a series of comparisons are made (utilizing $S_{j1}$, $S_{j2}$ and $S_{j3}$ from a third frame where necessary—see Table 4) to determine which of the five channel states (PAD-4 no-RB, RB-0 PAD-4, RB-1 PAD-4, PAD-4 RB-0, and PAD-4 RB-1) is present for that slot.

Similar algorithms can be provided by those skilled in the art with reference to other two-level or three-level probing signals. In addition, the algorithms provided can account for A-law as well as μ-law situations.

It should be appreciated that the algorithms set forth above assume that there are the same robbed bits (0 or 1) at a given slot within at least two, three or more frames, depending on the processing interval. However, it is possible that the robbed bit can be changed within the processing interval which would not affect the correctness of the PAD attenuation determination but could lead to an error in the robbed bit detection and make a RB+PAD channel indistinguishable from a PAD+RB channel. In order to eliminate possible errors, according to the invention, the proposed probing signals of FIGS. 2a and 2b may be repeated several times. This will allow the receiver to compare the received levels at the same slot of different frames and detect level changes. In addition, in order to avoid the influence of possible periodicity of the robbed bit transmission, the probing signals can be transmitted in a pseudorandom manner as hereinafter described.

Assuming a two-level probing signal, when there are no robbed bit changes within the processing interval, it is sufficient to transmit the probing signal shown in FIG. 2a; i.e., signals ±S1 in the first frame, and signals ±S2 in the second frame. However, to detect RB changes, the following seven-symbol pseudorandom sequence of the ±S1 and ±S2 signals can be utilized: ±S1, ±S1, ±S2, ±S1, ±S2, ±S2, ±S2 placed within seven frames. The receiver obtains a transformed sequence for the i'th slot of $S_{1i}$, $S_{2i}$, $S_{3i}$, $S_{4i}$, $S_{5i}$, $S_{6i}$, $S_{7i}$. If $S_{1i}=S_{2i}=S_{4i}$, and $S_{3i}=S_{5i}=S_{6i}=S_{7i}$, then there are no level changes within the i'th slot. Similarly, assuming a three-level probing signal, when there are no robbed bit changes within the processing interval, it is sufficient to transmit the probing signal shown in FIG. 2b; i.e., signals ±S1, ±S2, and ±S3 successively transmitted within three frames. To detect RB changes, the following eight-symbol pseudorandom sequence of signals are sent within eight frames: ±S1, ±S2, ±S3, ±S3, ±15, ±S3, ±S2, ±S2. The receiver obtains a transformed sequence for the i'th slot of $S_{1i}$, $S_{2i}$, $S_{3i}$, $S_{4i}$, $S_{5i}$, $S_{6i}$, $S_{7i}$, $S_{8i}$. If $S_{1i}=S_{5i}$, $S_{2i}=S_{7i}=S_{8i}$, and $S_{3i}=S_{4i}=S_{6i}$, then there are no level changes within the i'th slot. If no level changes are detected, then the diagnosis algorithm discussed above with reference to FIG. 3 can be used. However, if level changes are detected, the RB presence is indicated, and a solution for non-PAD channels is obtained. However, for PAD-attenuated channels, there are two options. First, a processing interval without RB changes can be found, and within this interval the receiver can use the algorithm discussed above with reference to FIG. 3 to distinguish between the RB+PAD and PAD+RB states. Alternatively, a signal constellation which is suitable for both the RB+PAD and PAD+RB states can be utilized.

There have been described and illustrated apparatus and methods for probing PCM channels in order to determine the presence and extent of PAD attenuation and RB-signaling distortion. While particular embodiments of the invention have been described, it is not intended that the invention be limited exactly thereto, as it is intended that the invention be as broad in scope as the art will permit. Thus, while the invention has been described with respect to certain hardware, it will be appreciated that various functions can be carried in different hardware and/or software. Also, while particular two-level and three-level probing signals were described as preferred, it will be appreciated that other two-level and three-level probing signals could be utilized. In fact, if desired, four- and higher-level probing signals could be utilized, although for purposes channel diagnosis they are not preferred as they add unnecessary complexity and delay. In addition, while a particular algorithm for finding the exact channel state was set forth, it will be appreciated that other algorithms could be utilized utilizing the multi-level probing signals of the invention. Therefore, it will be apparent to those skilled in the art that other changes and modifications may be made to the invention as described in the specification without departing from the spirit and scope of the invention as so claimed.

TABLE I

Two-level signals in RB-signalling and 3-dB or 6-dB PAD-attenuation channels

| Channel State | Transforms of Signals | | Dmin for Signals | | Transforms of Signals | | Dmin for Signals | |
|---|---|---|---|---|---|---|---|---|
| | 1023 | 975 | 1023 | 975 | 1087 | 879 | 1087 | 879 |
| No RB & PAD | 1023 | 975 | 48 | 32 | 1087 | 879 | 64 | 32 |
| RB-0 | 1087 | 975 | 64 | 32 | 1087 | 911 | 64 | 32 |
| RB-1 | 1023 | 943 | 48 | 32 | 1023 | 879 | 48 | 32 |
| PAD-3 | 719 | 687 | 32 | 32 | 783 | 623 | 32 | 32 |
| PAD-6 | 527 | 495 | 32 | 24 | 559 | 439 | 32 | 16 |
| RB-0, PAD-3 | 783 | 687 | 32 | 32 | 783 | 655 | 32 | 32 |
| RB-1, PAD-3 | 719 | 655 | 32 | 32 | 719 | 623 | 32 | 32 |
| PAD-3, RB-0 | 719 | 719 | 32 | 32 | 783 | 655 | 32 | 32 |
| PAD-3, RB-1 | 687 | 687 | 32 | 32 | 751 | 623 | 32 | 32 |
| RB-0, PAD-6 | 559 | 495 | 32 | 24 | 559 | 455 | 32 | 16 |
| RB-1, PAD-6 | 527 | 471 | 32 | 16 | 527 | 439 | 32 | 16 |
| PAD-6, RB-0 | 527 | 527 | 32 | 32 | 591 | 439 | 32 | 16 |
| PAD-6, RB-1 | 495 | 495 | 24 | 24 | 559 | 423 | 32 | 16 |

TABLE 2

Transforms of the 1023/975 signal in RB-signalind and 1 dB, 3 dB, 4 dB, 5 dB, and 6 dB PAD-attenuation channels

| | Transforms of Signals | |
|---|---|---|
| Channel State | 1023 | 975 |
| No RB & PAD | 1023 | 975 |
| RB-0, no PAD | 1087 | 975 |
| RB-1, no PAD | 1023 | 943 |
| PAD-1 | 911 | 879 |
| RB-0, PAD-1 | 975 | 879 |
| RB-1, PAD-1 | 911 | 847 |
| PAD-1, RB-0 | 911 | 911 |
| PAD-1, RB-1 | 879 | 879 |
| PAD-3 | 719 | 687 |
| RB-0, PAD-3 | 783 | 687 |
| RB-1, PAD-3 | 719 | 655 |
| PAd-3, RB-0 | 719 | 719 |
| PAD-3, RB-1 | 687 | 687 |
| PAD-4 | 655 | 623 |
| RB-0, PAD-4 | 687 | 623 |
| RB-1, PAD-4 | 655 | 591 |
| PAD-4, RB-0 | 655 | 655 |
| PAD-4, RB-1 | 623 | 623 |
| PAD-5 | 591* | 559 |
| RB-0, PAD-5 | 623 | 559 |
| RB-1, PAD-5 | 591 | 527 |
| PAD-5, RB-0 | 591 | 591 |
| PAd-5, RB-1 | 559 | 559 |
| PAD-6 | 527 | 495 |
| RB-0, PAD-6 | 559 | 495 |
| RB-1, PAD-6 | 527 | 471 |
| PAD-6, RB-0 | 527 | 527 |
| PAD-6, RB-1 | 495 | 495 |

*We assume that signal 1023 is transformed into signal 591 because the 5-dB transform of 1023 is 575.37, which is closer to 591 than to 559. If signal 1023 is transformed into 559 the above signal can not be used for 5 dB attenuation identification.

TABLE 3

Combinations of signals in RB-signaling and PAD-attenuation channels

| | Transforms of Signals | | | | | |
|---|---|---|---|---|---|---|
| Channel State | 1023 | 975 | 1087 | 879 | 911 | 943 | 1151 |
| No RB & PAD | 1023 | 975 | 1087 | 879 | 911 | 943 | 1151 |
| RB-0, no PAD | 1087 | 975 | 1087 | 911 | 911 | 975 | 1215 |

TABLE 3-continued

Combinations of signals in RB-signaling and PAD-attenuation channels

| Channel State | Transforms of Signals | | | | | |
|---|---|---|---|---|---|---|
| | 1023 | 975 | 1087 | 879 | 911 | 943 | 1151 |
| RB-1, no PAD | 1023 | 943 | 1023 | 879 | 879 | 943 | 1151 |
| PAD-1 | 911 | 879 | 975 | 783 | 815 | 847 | 1023 |
| RB-0, PAD-1 | 975 | 879 | 975 | 815 | 815 | 879 | 1087 |
| RB-1, PAD-1 | 911 | 847 | 911 | 783 | 783 | 847 | 1023 |
| PAD-1, RB-0 | 911 | 911 | 975 | 783 | 847 | 847 | 1087 |
| PAD-1, RB-1 | 879 | 879 | 943 | 751 | 815 | 815 | 1023 |
| PAD-2 | 815 | 783 | 879/847 | 687 | 719 | 751 | 911 |
| RB-0, PAD-2 | 879/847 | 783 | 879/847 | 719 | 719 | 783 | 975 |
| RB-1, PAD-2 | 815 | 751 | 815 | 687 | 687 | 751 | 911 |
| PAD-2, RB-0 | 847 | 783 | 911/847 | 719 | 719 | 783 | 911 |
| PAD-2, RB-1 | 815 | 751 | 879/815 | 687 | 687 | 751 | 879 |
| PAD-3 | 719 | 687 | 783 | 623 | 655 | 655 | 815 |
| RB-0, PAD-3 | 783 | 687 | 783 | 655 | 655 | 687 | 847 |
| RB-1, PAD-3 | 719 | 655 | 719 | 623 | 623 | 655 | 815 |
| PAD-3, RB-0 | 719 | 719 | 783 | 655 | 655 | 655 | 847 |
| PAD-3, RB-1 | 687 | 687 | 751 | 623 | 623 | 623 | 815 |
| PAD-4 | 655 | 623 | 687 | 559 | 559 | 591 | 719 |
| RB-0, PAD-4 | 687 | 623 | 687 | 559 | 559 | 623 | 751 |
| RB-1, PAD-4 | 655 | 591 | 655 | 559 | 559 | 591 | 719 |
| PAD-4, RB-0 | 655 | 655 | 719 | 591 | 591 | 591 | 719 |
| PAD-4, RB-1 | 623 | 623 | 687 | 559 | 559 | 559 | 687 |
| PAD-5 | 591/559 | 559 | 623 | 495 | 527 | 527 | 655 |
| RB-0, PAD-5 | 623 | 559 | 623 | 527 | 527 | 559 | 687 |
| RB-1, PAD-5 | 591/559 | 527 | 591/559 | 495 | 495 | 527 | 655 |
| PAD-5, RB-0 | 591 | 591 | 655 | 527 | 527 | 527 | 655 |
| PAD-5, RB-1 | 559 | 559 | 623 | 495 | 495 | 495 | 623 |
| PAD-6 | 527 | 495 | 559 | 439 | 455 | 471 | 591 |
| RB-0, PAD-6 | 559 | 495 | 559 | 455 | 455 | 495 | 623 |
| RB-1, PAD-6 | 527 | 471 | 527 | 439 | 439 | 471 | 591 |
| PAD-6, RB-0 | 527 | 527 | 591 | 439 | 471 | 471 | 591 |
| PAD-6, RB-1 | 495 | 495 | 559 | 423 | 455 | 455 | 559 |

TABLE 4

Transforms of 5983/6239/1599 signals in RB and PAD channels

| Channel State | Transforms of Signals | | | Decision Thresholds |
|---|---|---|---|---|
| | 1599 | 6239 | 5983 | |
| No RB & PAD | | 6239 | 5983 | |
| RB-0, no PAD | | 6495 | 5983 | |
| RB-1, no PAD | | 6239 | 5727 | 11,454 (1st threshold) |
| PAD-1 | 1407 | 5471 | 5215 | |
| RB-0, PAD-1 | | 5727 | 5215 | |
| RB-1, PAD-1 | 1343 | 5471 | 5215 | |
| PAD-1, RB-0 | | 5471 | 5471 | |
| PAD-1, RB-1 | | 5215 | 5215 | |
| | | | | 10,174 (4th threshold) |
| PAD-2 | | 4959 | 4703 | |
| RB-0, PAD-2 | | 5215 | 4703 | |
| RB-1, PAD-2 | | 4959 | 4447 | |
| PAD-2, RB-0 | | 4959 | 4959 | |
| PAD-2, RB-1 | | 4703 | 4703 | |
| | | | | 9150 (3rd threshold) |
| PAD-3 | | 4447 | 4191 | |
| RB-0, PAD-3 | | 4703 | 4191 | |
| RB-1, PAD-3 | | 4447 | 3999 | |
| PAD-3, RB-0 | | 4447 | 4447 | |
| PAD-3, RB-1 | | 4191 | 4191 | |
| | | | | 8158 (2nd threshold) |
| PAD-4 | | 3871 | 3743 | |
| RB-0, PAD-4 | | 4191 | 3743 | |
| RB-1, PAD-4 | 975 | 3871 | 3615 | |
| PAD-4, RB-0 | | 3999 | 3743 | |
| PAD-4, RB-1 | 1023 | 3871 | 3615 | |
| | | | | 7230 (4th threshold) |
| PAD-5 | | 3487 | 3359 | |
| RB-0, PAD-5 | | 3615 | 3359 | |
| RB-1, PAD-5 | | 3487 | 3231 | |

TABLE 4-continued

Transforms of 5983/6239/1599 signals in RB and PAD channels

| Channel State | Transforms of Signals | | | Decision Thresholds |
|---|---|---|---|---|
| | 1599 | 6239 | 5983 | |
| PAD-5, RB-0 | | 3487 | 3487 | |
| PAD-5, RB-1 | | 3359 | 3359 | |
| | | | | 6462 (3rd threshold) |
| PAD-6 | | 3103 | 2975 | |
| RB-0, PAD-6 | 815 | 3231 | 2975 | |
| RB-1, PAD-6 | 783 | 3103 | 2847 | |
| PAD-6, RB-0 | 847 | 3231 | 2975 | |
| PAD-6, RB-1 | 815 | 3103 | 2847 | |

TABLE 5

Example of Probing Signals for USA and International Applications

| Channel State | USA Application<br>μ-law, 3 db & 6 dB PAD, RB | | International Application<br>A-law, 1 dB through<br>7 dB PAD |
|---|---|---|---|
| Level | 1023 | 975 | 3392 |
| Code | 10101111 | | 11111010 |
| No RB & PAD | 1023 | 975 | 3392 |
| RB-0, no PAD | 1087 | 975 | — |
| RB-1, no PAD | 1023 | 943 | — |
| PAD-1 | — | — | 3008 |
| PAD-2 | — | — | 2752 |
| PAD-3 | 719 | 687 | 2368 |
| RB-0, PAD-3 | 783 | 687 | — |
| RB-1, PAD-3 | 719 | 655 | — |
| PAD-3, RB-0 | 719 | 719 | — |
| PAD-3, RB-1 | 687 | 687 | — |
| PAD-4 | — | — | 2112 |
| PAD-5 | — | — | 1888 |
| PAD-6 | 527 | 495 | 1696 |
| RB-0, PAD-6 | 559 | 495 | — |
| RB-1, PAD-6 | 527 | 471 | — |
| PAD-6, RB-0 | 527 | 527 | — |
| PAD-6, RB-1 | 495 | 495 | — |
| PAD-7 | — | — | 1504 |

Appendix 1

μ-law set of points and its 3 dB and 6 dB transforms

| | μ-law | | | 3 dB-PAD-law | | 6 dB-PAD law | |
|---|---|---|---|---|---|---|---|
| Sector # | Level # | Level Value | Code 12345678 | Level Value | Dist. | Level Value | Dist. |
| 8 | 127 | 8031 | 10000000 | 5727 | 256 | 3999 | 128 |
| 8 | 126 | 7775 | 10000001 | 5471 | 256 | 3871 | 128 |
| 8 | 125 | 7519 | 10000010 | 5215 | 0 | 3743 | 128 |
| 8 | 124 | 7263 | 10000011 | 5215 | 256 | 3615 | 128 |
| 8 | 123 | 7007 | 10000100 | 4959 | 256 | 3487 | 128 |
| 8 | 122 | 6751 | 10000101 | 4703 | 0 | 3359 | 128 |
| 8 | 121 | 6495 | 10000110 | 4703 | 256 | 3231 | 128 |
| 8 | 120 | 6239 | 10000111 | 4447 | 256 | 3103 | 128 |
| 8 | 119 | 5983 | 10001000 | 4191 | 192 | 2975 | 128 |
| 8 | 118 | 5727 | 10001001 | 3999 | 128 | 2847 | 128 |
| 8 | 117 | 5471 | 10001010 | 3871 | 128 | 2719 | 128 |
| 8 | 116 | 5215 | 10001011 | 3743 | 256 | 2591 | 128 |
| 8 | 115 | 4959 | 10001100 | 3487 | 128 | 2463 | 128 |
| 8 | 114 | 4703 | 10001101 | 3359 | 256 | 2335 | 128 |
| 8 | 113 | 4447 | 10001110 | 3103 | 128 | 2207 | 128 |
| 8 | 112 | 4191 | 10001111 | 2975 | 128 | 2079 | 96 |
| 7 | 111 | 3999 | 10010000 | 2847 | 128 | 1983 | 64 |
| 7 | 110 | 3871 | 10010001 | 2719 | 128 | 1919 | 64 |
| 7 | 109 | 3743 | 10010010 | 2591 | 0 | 1855 | 64 |
| 7 | 108 | 3615 | 10010011 | 2591 | 128 | 1791 | 64 |
| 7 | 107 | 3487 | 10010100 | 2463 | 128 | 1727 | 64 |

Appendix 1-continued

μ-law set of points and its 3 dB and 6 dB transforms

| Sector # | Level # | μ-law Level Value | Code 12345678 | 3 dB-PAD-law Level Value | Dist. | 6 dB-PAD law Level Value | Dist. |
|---|---|---|---|---|---|---|---|
| 7 | 106 | 3359 | 10010101 | 2335 | 0 | 1663 | 64 |
| 7 | 105 | 3231 | 10010110 | 2335 | 128 | 1599 | 64 |
| 7 | 104 | 3103 | 10010111 | 2207 | 128 | 1535 | 64 |
| 7 | 103 | 2975 | 10011000 | 2079 | 96 | 1471 | 64 |
| 7 | 102 | 2847 | 10011001 | 1983 | 64 | 1407 | 64 |
| 7 | 101 | 2719 | 10011010 | 1919 | 64 | 1343 | 64 |
| 7 | 100 | 2591 | 10011011 | 1855 | 128 | 1279 | 64 |
| 7 | 99 | 2463 | 10011100 | 1727 | 64 | 1215 | 64 |
| 7 | 98 | 2335 | 10011101 | 1663 | 128 | 1151 | 64 |
| 7 | 97 | 2207 | 10011110 | 1535 | 64 | 1087 | 64 |
| 7 | 96 | 2079 | 10011111 | 1471 | 64 | 1023 | 48 |
| 6 | 95 | 1983 | 10100000 | 1407 | 64 | 975 | 0 |
| 6 | 94 | 1919 | 10100001 | 1343 | 0 | 975 | 32 |
| 6 | 93 | 1855 | 10100010 | 1343 | 64 | 943 | 32 |
| 6 | 92 | 1791 | 10100011 | 1279 | 64 | 911 | 32 |
| 6 | 91 | 1727 | 10100100 | 1215 | 64 | 879 | 32 |
| 6 | 90 | 1663 | 10100101 | 1151 | 0 | 847 | 32 |
| 6 | 89 | 1599 | 10100110 | 1151 | 64 | 815 | 32 |
| 6 | 88 | 1535 | 10100111 | 1087 | 64 | 783 | 32 |
| 6 | 87 | 1471 | 10101000 | 1023 | 48 | 751 | 32 |
| 6 | 86 | 1407 | 10101001 | 975 | 32 | 719 | 32 |
| 6 | 85 | 1343 | 10101010 | 943 | 32 | 687 | 32 |
| 6 | 84 | 1279 | 10101011 | 911 | 64 | 655 | 32 |
| 6 | 83 | 1215 | 10101100 | 847 | 32 | 623 | 32 |
| 6 | 82 | 1151 | 10101101 | 815 | 32 | 591 | 32 |
| 6 | 81 | 1087 | 10101110 | 783 | 64 | 559 | 32 |
| 6 | 80 | 1023 | 10101111 | 719 | 32 | 527 | 32 |
| 5 | 79 | 975 | 10110000 | 687 | 32 | 495 | 24 |
| 5 | 78 | 943 | 10110001 | 655 | 0 | 471 | 16 |
| 5 | 77 | 911 | 10110010 | 655 | 32 | 455 | 16 |
| 5 | 76 | 879 | 10110011 | 623 | 32 | 439 | 16 |
| 5 | 75 | 847 | 10110100 | 591 | 0 | 423 | 16 |
| 5 | 74 | 815 | 10110101 | 591 | 32 | 407 | 16 |
| 5 | 73 | 783 | 10110110 | 559 | 32 | 391 | 16 |
| 5 | 72 | 751 | 10110111 | 527 | 32 | 375 | 16 |
| 5 | 71 | 719 | 10111000 | 495 | 0 | 359 | 16 |
| 5 | 70 | 687 | 10111001 | 495 | 24 | 343 | 16 |
| 5 | 69 | 655 | 10111010 | 471 | 32 | 327 | 16 |
| 5 | 68 | 623 | 10111011 | 439 | 16 | 311 | 16 |
| 5 | 67 | 591 | 10111100 | 423 | 32 | 295 | 16 |
| 5 | 66 | 559 | 10111101 | 391 | 16 | 279 | 16 |
| 5 | 65 | 527 | 10111110 | 375 | 32 | 263 | 16 |
| 5 | 64 | 495 | 10111111 | 343 | 16 | 247 | 16 |
| 4 | 63 | 471 | 11000000 | 327 | 0 | 231 | 0 |
| 4 | 62 | 455 | 11000001 | 327 | 16 | 231 | 12 |
| 4 | 61 | 439 | 11000010 | 311 | 16 | 219 | 8 |
| 4 | 60 | 423 | 11000011 | 295 | 0 | 211 | 8 |
| 4 | 59 | 407 | 11000100 | 295 | 16 | 203 | 8 |
| 4 | 58 | 391 | 11000101 | 279 | 16 | 195 | 8 |
| 4 | 57 | 375 | 11000110 | 263 | 16 | 187 | 8 |
| 4 | 56 | 359 | 11000111 | 247 | 0 | 179 | 8 |
| 4 | 55 | 343 | 11001000 | 247 | 16 | 171 | 8 |
| 4 | 54 | 327 | 11001001 | 231 | 12 | 163 | 8 |
| 4 | 53 | 311 | 11001010 | 219 | 8 | 155 | 8 |
| 4 | 52 | 295 | 11001011 | 211 | 16 | 147 | 8 |
| 4 | 51 | 279 | 11001100 | 195 | 8 | 139 | 8 |
| 4 | 50 | 263 | 11001101 | 187 | 16 | 131 | 8 |
| 4 | 49 | 247 | 11001110 | 171 | 8 | 123 | 8 |
| 4 | 48 | 231 | 11001111 | 163 | 8 | 115 | 8 |
| 3 | 47 | 219 | 11010000 | 155 | 8 | 107 | 0 |
| 3 | 46 | 211 | 11010001 | 147 | 0 | 107 | 8 |
| 3 | 45 | 203 | 11010010 | 147 | 8 | 99 | 0 |
| 3 | 44 | 195 | 11010011 | 139 | 8 | 99 | 6 |
| 3 | 43 | 187 | 11010100 | 131 | 8 | 93 | 4 |
| 3 | 42 | 179 | 11010101 | 123 | 0 | 89 | 4 |
| 3 | 41 | 181 | 11010110 | 123 | 8 | 85 | 4 |
| 3 | 40 | 163 | 11010111 | 115 | 8 | 81 | 4 |
| 3 | 39 | 155 | 11011000 | 107 | 0 | 77 | 4 |
| 3 | 38 | 147 | 11011001 | 107 | 8 | 73 | 4 |
| 3 | 37 | 139 | 11011010 | 99 | 6 | 69 | 4 |
| 3 | 36 | 131 | 11011011 | 93 | 4 | 65 | 4 |
| 3 | 35 | 123 | 11011100 | 89 | 8 | 61 | 4 |
| 3 | 34 | 115 | 11011101 | 81 | 4 | 57 | 4 |
| 3 | 33 | 107 | 11011110 | 77 | 8 | 53 | 4 |
| 3 | 32 | 99 | 11011111 | 69 | 4 | 49 | 4 |
| 2 | 31 | 93 | 11100000 | 65 | 0 | 45 | 0 |
| 2 | 30 | 89 | 11100001 | 65 | 4 | 45 | 4 |
| 2 | 29 | 85 | 11100010 | 61 | 4 | 41 | 0 |
| 2 | 28 | 81 | 11100011 | 57 | 4 | 41 | 4 |
| 2 | 27 | 77 | 11100100 | 53 | 0 | 37 | 0 |
| 2 | 26 | 73 | 11100101 | 53 | 4 | 37 | 4 |
| 2 | 25 | 69 | 11100110 | 49 | 4 | 33 | 0 |
| 2 | 24 | 65 | 11100111 | 45 | 0 | 33 | 3 |
| 2 | 23 | 61 | 11101000 | 45 | 4 | 30 | 2 |
| 2 | 22 | 57 | 11101001 | 41 | 4 | 28 | 2 |
| 2 | 21 | 53 | 11101010 | 37 | 4 | 26 | 2 |
| 2 | 20 | 49 | 11101011 | 33 | 0 | 24 | 2 |
| 2 | 19 | 45 | 11101100 | 33 | 3 | 22 | 2 |
| 2 | 18 | 41 | 11101101 | 30 | 4 | 20 | 2 |
| 2 | 17 | 37 | 11101110 | 26 | 2 | 18 | 2 |
| 2 | 16 | 33 | 11101111 | 24 | 2 | 16 | 2 |
| 1 | 15 | 30 | 11110000 | 22 | 2 | 14 | 0 |
| 1 | 14 | 28 | 11110001 | 20 | 2 | 14 | 2 |
| 1 | 13 | 26 | 11110010 | 18 | 2 | 12 | 0 |
| 1 | 12 | 24 | 11110011 | 16 | 0 | 12 | 2 |
| 1 | 11 | 22 | 11110100 | 16 | 2 | 10 | 0 |
| 1 | 10 | 20 | 11110101 | 14 | 2 | 10 | 2 |
| 1 | 9 | 18 | 11110110 | 12 | 0 | 8 | 0 |
| 1 | 8 | 16 | 11110111 | 12 | 2 | 8 | 2 |
| 1 | 7 | 14 | 11111000 | 10 | 2 | 6 | 0 |
| 1 | 6 | 12 | 11111001 | 8 | 0 | 6 | 2 |
| 1 | 5 | 10 | 11111010 | 8 | 2 | 4 | 0 |
| 1 | 4 | 8 | 11111011 | 6 | 2 | 4 | 2 |
| 1 | 3 | 6 | 11111100 | 4 | 2 | 2 | 0 |
| 1 | 2 | 4 | 11111101 | 2 | 0 | 2 | 2 |
| 1 | 1 | 2 | 11111110 | 2 | 2 | 0 | 0 |
| 1 | 0 | 0 | 11111111 | 0 | | 0 | |

Appendix 2

Examples of 3 dB-PAD and 6 dB-PAD Constellations
3 dB-PAD-Constellations $D_{min} = 16$, $N_{max} = 116$, (54.667 kbps, 6D),
$F_{min} = 32/116 = 0.28$, $P = -12.19$ dBm j1 = [0,0,0,0,0,1,0,0,0,0,0,0,0,0];
j2 = [1,0,0,0,0,0,1,0,0,0,0,1,0,0,0];
j3 = [0,1,0,0,1,0,0,0,1,0,0,1,0,1,0];
j4 = [1,0,1,0,1,0,1,1,0,1,1,1,0,1,1];
j5 = [1,1,1,1,1,1,1,1,0,1,1,1,1,1,0,1];
j6 = [1,1,1,1,1,1,1,1,1,1,0,1,1,1,0,1];
j7 = [1,1,1,1,1,1,1,1,1,1,1,0,0,0,0,0];
j8 = [0,0,0,0,0,0,0,0,0,0,0,0,0,0,0];
$D_{min} = 32$, $N_{max} = 80$, (50.667 kbps, 3D),
$F_{min} = 32/80 = 0.4$, $P = -12.04$ dBm j1 = [0,0,0,0,0,0,0,0,0,0,1,0,0,0,0];
j2 = [0,0,0,0,0,0,0,1,0,0,0,0,0,0,0];
j3 = [0,0,1,0,0,0,0,0,1,0,0,0,0,1,0,0];
j4 = [0,0,1,0,0,1,0,0,0,1,0,0,1,0,0,1];
j5 = [0,1,0,1,0,1,0,0,1,1,1,0,1,1,0,1];
j6 = [1,1,1,1,1,1,1,1,1,1,1,0,1,1,1,0,1];
j7 = [1,1,1,1,1,1,1,0,0,0,0,0,0,0,0];
j8 = [0,0,0,0,0,0,0,0,0,0,0,0,0,0,0];
$D_{min} = 64$, $N_{max} = 50$, (45.333 kbps, 3D),
$F_{min} = 36/50 = 0.72$, $P = -12.08$ dBm j1 = [0,0,0,0,0,0,0,0,0,0,0,0,0,0,0];
j2 = [0,0,0,1,0,0,0,0,0,0,0,0,0,0,0];
j3 = [0,0,0,0,0,1,0,0,0,0,0,0,0,0,0];

Appendix 2-continued

Examples of 3 dB-PAD and 6 dB-PAD Constellations
j4 = [1,0,0,0,0,0,1,0,0,0,0,1,0,0,0,0];
j5 = [0,1,0,0,1,0,0,0,1,0,1,0,0,1,0,0];
j6 = [1,1,0,1,1,0,1,0,1,1,0,1,1,1,0,1];
j7 = [1,1,1,1,0,0,0,0,0,0,0,0,0,0,0,0];
j8 = [0,0,0,0,0,0,0,0,0,0,0,0,0,0,0,0];
$D_{min}$ = 128, $N_{max}$ = 24, (36 kbps, 2D),
$F_{min}$ = 8/24 = 0.33, P = −12.20 dBm j1 = [0,0,0,0,0,0,0,0,0,0,0,0,0,0,0,0];
j2 = [0,0,0,0,0,0,0,0,0,0,0,0,0,0,0,1];
j3 = [0,0,0,0,0,0,0,0,0,0,0,0,0,0,0,0];
j4 = [0,0,0,1,0,0,0,0,0,0,0,0,0,0,1,0];
j5 = [0,0,0,0,0,1,0,0,0,0,0,0,1,0,0,0];
j6 = [0,1,0,0,1,0,0,0,1,0,0,1,0,1,0,0];
j7 = [1,0,1,0,0,0,0,0,0,0,0,0,0,0,0,0];
j8 = [0,0,0,0,0,0,0,0,0,0,0,0,0,0,0,0];
6dB-PAD-Constellations $D_{min}$ = 8, $N_{max}$ = 162, (58.667 kbps, 3D),
$F_{min}$ = 112/162 = 0.69, P = −12.01 dBm j1 = [0,0,0,0,1,0,0,0,0,0,0,0,1,0,0,0];
j2 = [0,0,1,0,0,0,1,0,0,0,1,0,0,0,0,0];
j3 = [0,1,0,1,0,1,0,1,0,1,0,1,0,0,1,0];
j4 = [1,1,1,1,1,1,1,1,1,1,1,1,1,1,1,0];
j5 = [1,1,1,1,1,1,1,1,1,1,1,1,1,1,1,1];
j6 = [1,1,1,1,1,1,1,1,1,1,1,1,1,1,1,0];
j7 = [1,1,1,1,1,1,1,1,1,1,1,1,1,1,1,1];
j8 = [1,1,1,1,1,1,0,0,0,0,0,0,0,0,0,0];
$D_{min}$ = 16, $N_{max}$ = 128, (56 kbps, 1D),
$F_{min}$ = 76/128 = 0.59, P = −12.09 dBm j1 = [0,0,0,0,0,0,0,0,1,0,0,0,0,0,0,0];
j2 = [0,0,0,0,1,0,0,0,0,0,0,0,1,0,0,0];
j3 = [0,0,1,0,0,0,1,0,0,0,0,0,0,1,0];
j4 = [0,1,0,1,0,1,0,1,0,1,0,1,0,0];
j5 = [1,1,1,1,1,1,1,1,1,1,1,1,1,1,1,1];
j6 = [1,1,1,1,1,1,1,1,1,1,1,1,1,1,1,0];
j7 = [1,1,1,1,1,1,1,1,1,1,1,1,1,1,1,1];
j8 = [1,1,1,0,0,0,0,0,1,0,0,0,0,0,0,0];
$D_{min}$ = 32, N = 92/90, (52 kbps, 2D),
$F_{min}$ = 54/92 = 0.59, P = −11.92 dBm (−12.20 for N = 90)

j1 = [0,0,0,0,0,0,0,0,0,0,0,0,0,0,0,0];
j2 = [1,0,0,0,0,0,0,0,0,0,0,0,0,0,0,0];
j3 = [1,0,0,0,0,0,0,0,1,0,0,0,0,0,0,0];
j4 = [1,0,0,0,1,0,0,0,1,0,0,0,1,0,0,0];
j5 = [1,0,1,0,1,0,1,0,1,0,1,0,1,0,0];
j6 = [1,1,1,1,1,1,1,1,1,1,1,1,1,1,1,0];
j7 = [1,1,1,1,1,1,1,1,1,1,1,1,1,1,1,1];
j8 = [0,0,0,0,0,0,0,0,0,0,0,0,0,0,0,0];

We claim:

1. A method of probing the state of a telecommunications channel, comprising:
   a) generating at a transmitter a two-level or three-level probing signal, said two-level or three-level probing signal having a first $\mu$-law level over a first frame and a second $\mu$-law level over a second frame;
   b) detecting at a receiver the two-level or three-level probing signal; and
   c) determining at the receiver the presence and order of RB-signaling and PAD attenuation, and the amount of PAD attenuation by comparing indications of transforms of the detected probing signals to a plurality of threshold values.

2. A method according to claim 1, wherein:
said two-level probing signal has a first PCM $\mu$-law level over a first frame of six symbols, and a second PCM $\mu$-law level over a second frame of six symbols.

3. A method according to claim 1, wherein:
an average power of said two-level probing signal is approximately −12.0 dBm.

4. A method according to claim 3, wherein:
said first $\mu$-law level is ±975, and said second $\mu$-law level is ±1023.

5. A method according to claim 3, wherein:
said first $\mu$-law level is ±879, and said second $\mu$-law level is ±1087.

6. A method according to claim 1, wherein:
said three-level probing signal has a first PCM $\mu$-law level over a first frame of six symbols, and a second PCM $\mu$-law level over a second frame of six symbols, and a third PCM $\mu$-law level over a third frame of six symbols.

7. A method according to claim 1, wherein:
an average power of said three-level probing signal is approximately −12.0 dBm.

8. A method according to claim 7, wherein:
said three-level probing signal has a third $\mu$-law level over a third frame,
said first $\mu$-law level is ±975, said second $\mu$-law level is ±1023, and said third $\mu$-law level is ±1151.

9. A method according to claim 1, wherein:
said three-level probing signal has a third $\mu$-law level over a third frame,
said first $\mu$-law level is ±1599, said second $\mu$-law level is ±5981, and said third $\mu$-law level is ±6239.

10. A method according to claim 1, wherein:
said first frame and said second frame are adjacent frames.

11. A method according to claim 1, wherein:
said determining comprises adding said indications of transforms to obtain a sum, and comparing said sum to at least one of said plurality of threshold values.

12. A method according to claim 1, wherein:
said first frame and said second frame each have a predetermined number of slots, and said generating, detecting, and determining are conducted for each of said predetermined number of slots.

13. A method according to claim 1, wherein:
said two-level or three-level probing signal comprises a multi-symbol pseudorandom sequence which is sent over several frames.

14. An apparatus coupled to a telecommunications channel, said apparatus comprising:
   a) a transmitter which generates at least one of a two-level and three-level probing signal, said at least one of a two-level and three-level probing signal having a first $\mu$-law level over a first frame and a second $\mu$-law level over a second frame and chosen such that the presence and order of RB-signaling and PAD attenuation in the telecommunications channel, and the amount of PAD attenuation in the telecommunications channel can be determined by comparing indications of transforms of the at least one of a two-level and three-level probing signal to a plurality of threshold values.

15. An apparatus according to claim 14, wherein:
said transmitter generates said two-level probing signal with a first PCM $\mu$-law level over a first frame of six symbols, and with a second PCM $\mu$-law level over a second frame of six symbols.

16. An apparatus according to claim 14, wherein:
said at least one of a two-level probing signal and a three-level probing signal has an average power of approximately −12.0 dBm.

17. An apparatus according to claim 16, wherein:

said first $\mu$-law level is ±975, and said second $\mu$-law level is ±1023, or said first $\mu$-law level is ±879, and said second $\mu$-law level is ±1087.

18. An apparatus according to claim 14, wherein:

said transmitter generates said three-level probing signal with a first PCM $\mu$-law level over a first frame of six symbols, with a second PCM $\mu$-law level over a second frame of six symbols, and with a third PCM $\mu$-law level over a third frame, and said first $\mu$-law level is ±975, said second $\mu$-law level is ±1023, and said third $\mu$-law level is ±1151, or said first $\mu$-law level is ±1599, said second $\mu$-law level is ±5981, and said third $\mu$-law level is ±6239.

19. An apparatus according to claim 14, wherein:

said two-level or three-level probing signal comprises a multi-symbol pseudorandom sequence which is sent over several frames.

* * * * *